May 26, 1953 R. C. SNEED ET AL 2,639,801
EGG HANDLING MACHINE
Filed Sept. 25, 1948 6 Sheets-Sheet 1

INVENTORS
ROBERT C. SNEED
CURTIS S. JORDAN
BY
ATTORNEYS

INVENTORS
ROBERT C. SNEED
CURTIS S. JORDAN
ATTORNEYS

May 26, 1953 R. C. SNEED ET AL 2,639,801
EGG HANDLING MACHINE

Filed Sept. 25, 1948 6 Sheets-Sheet 3

INVENTORS
ROBERT C. SNEED
CURTIS S. JORDAN
BY
ATTORNEYS

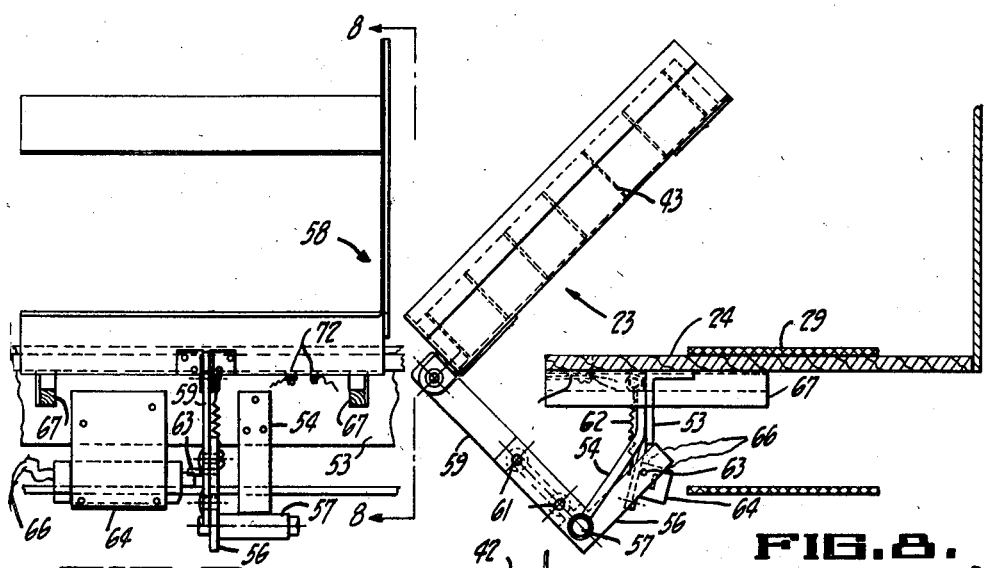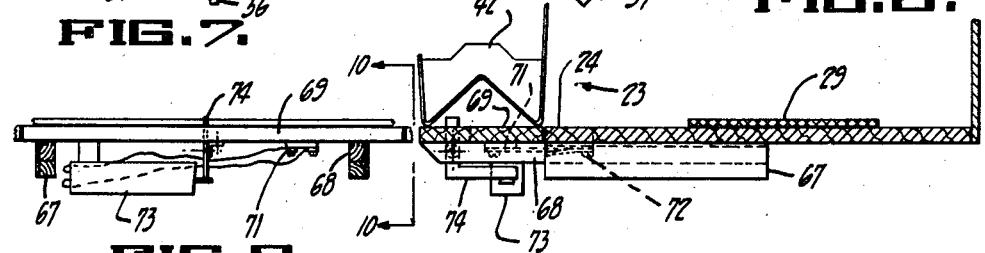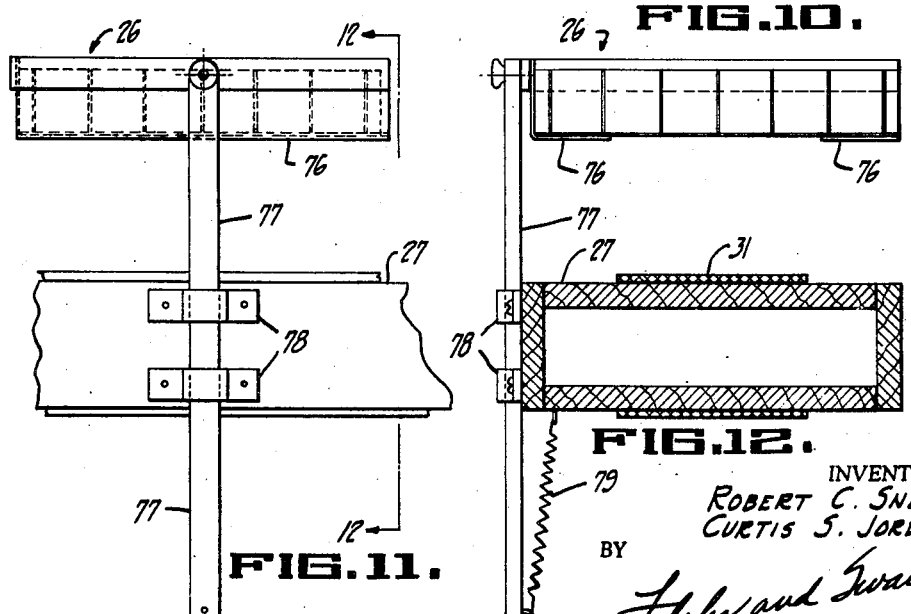

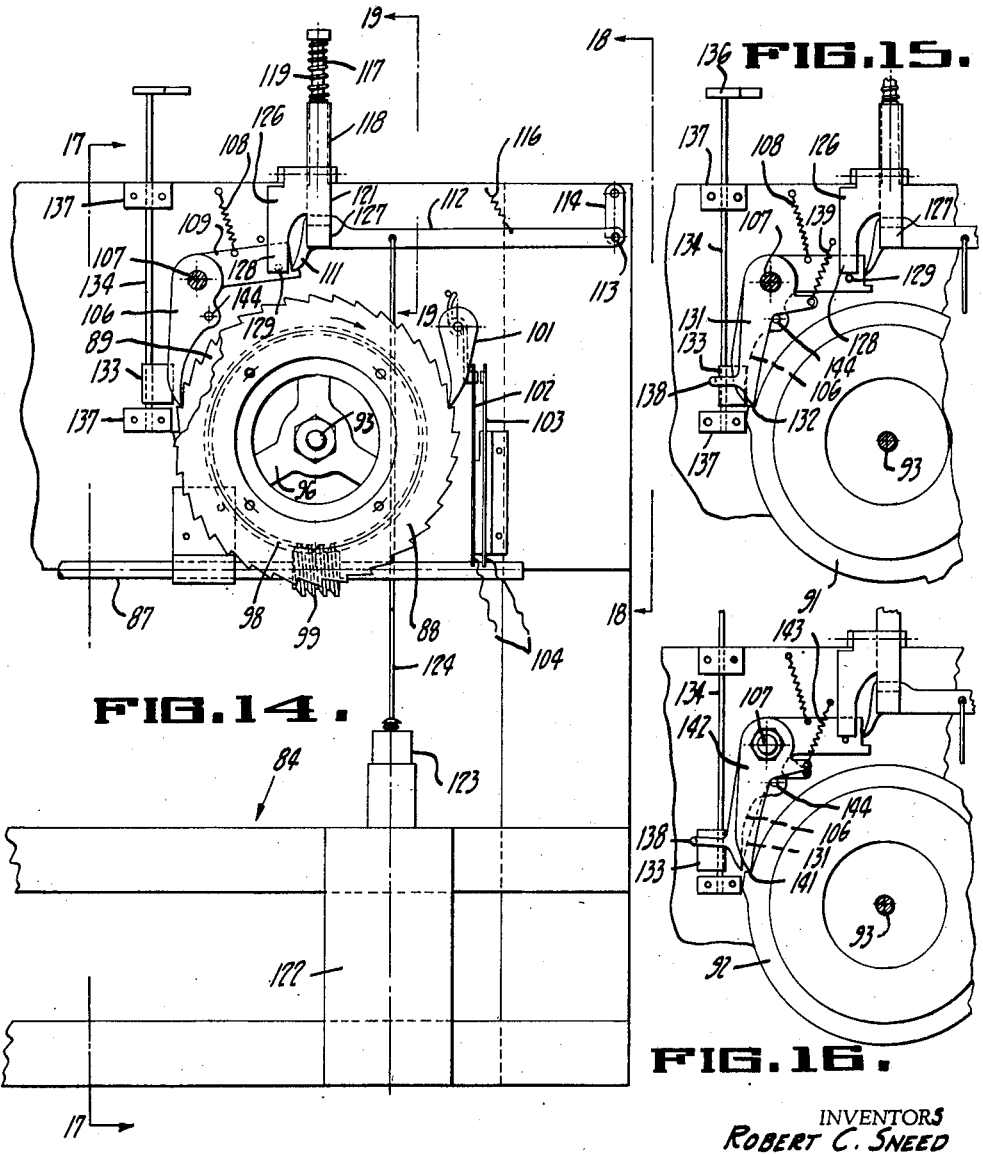

May 26, 1953  R. C. SNEED ET AL  2,639,801
EGG HANDLING MACHINE

Filed Sept. 25, 1948  6 Sheets-Sheet 6

INVENTORS
ROBERT C. SNEED
CURTIS S. JORDAN
BY Fish and Swain
ATTORNEYS

Patented May 26, 1953

2,639,801

UNITED STATES PATENT OFFICE 2,639,801

EGG HANDLING MACHINE

Robert C. Sneed, Piedmont, and Curtis S. Jordan, Maywood, Calif., assignors to Safeway Stores, Incorporated, Oakland, Calif., a corporation of Maryland Application September 25, 1948, Serial No. 51,192

3 Claims. (Cl. 198—27)

This invention relates to egg handling machines and is concerned more particularly with machines of this character which are used to facilitate candling and packaging and counting of eggs and the removal of the packaged eggs. This application is a continuation in part of our copending application, Serial No. 599,910, filed June 16, 1945, for an "Egg Handling Machine."

In the marketing of eggs it is customary to perform a quality grading operation as by candling and to package the eggs in appropriate numbers in containers, for example, by the dozen or the three dozen. In performing this operation it is desirable to handle a large number of eggs in a way in which a minimum of effort is required on the part of the operator or operators performing the various grading and packaging operations.

It is a general object of the invention to provide an improved machine which facilitates packaging of the eggs.

Another object of the invention is to provide improved egg handling equipment including means providing a convenient arrangement of egg receiving cartons at a packaging station.

Another object of the invention is to provide improved egg handling equipment including means for carrying away cartons of eggs when the same have been filled.

Other objects or advantages of the invention will be apparent from the following description of a preferred embodiment thereof as illustrated in the accompanying drawings in which:

Figure 7 is a view similar to Figure 5 but showing a modified arrangement of the carton holder in automatically counting the eggs placed in the carton.

Figure 8 is a sectional view of Figure 7 taken as indicated by the line 8—8 in Figure 7.

Figure 9 is an elevational view of a holder for a carton adapted to contain a dozen eggs at the packaging station of the machine.

Figure 10 is a sectional view of the holder shown in Figure 9 as indicated by the line 10—10 therein.

Figure 11 is an elevational view of a modified holder for a carton adapted to contain thirty-six eggs.

Figure 12 is an elevational view partly in section of the holder shown in Figure 11 and taken as indicated by the line 12—12 in Figure 11.

Figure 13 is a schematic plan view showing the arrangement of the various counting devices at the packaging station.

Figure 14 is a plan view of one of the counting devices and its related parts.

Figure 15 is a fragmentary detailed view similar to Figure 14 showing the position of the parts for counting eggs in lots of a dozen.

Figure 16 is a view similar to Figure 15 showing the position of the parts for counting eggs in lots of three dozen.

Figure 1:
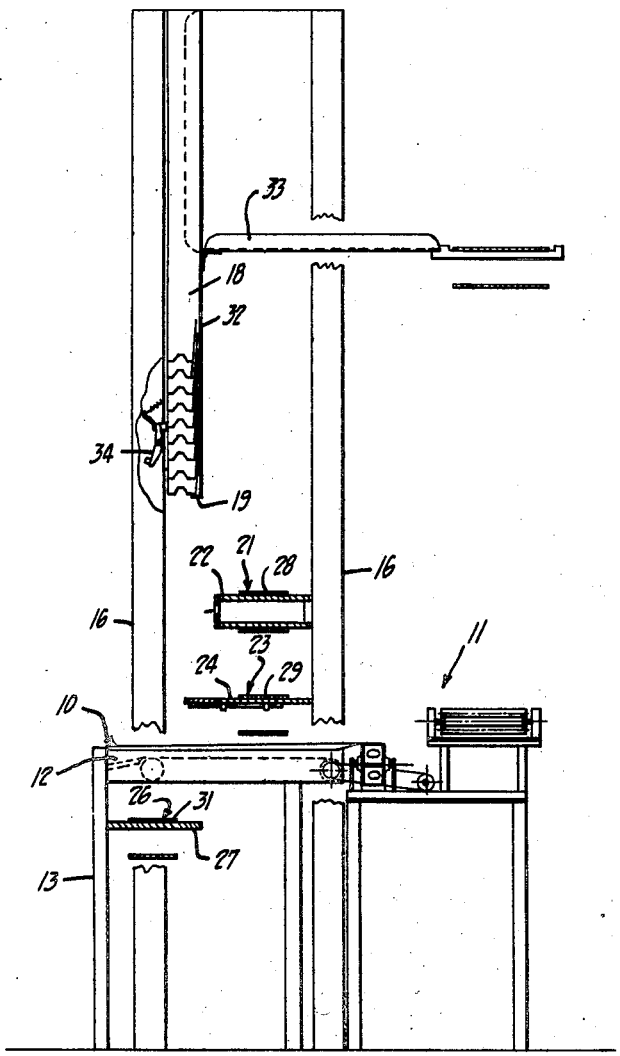
Figure 1 is a side elevational view of the egg handling equipment.
Figure 2:
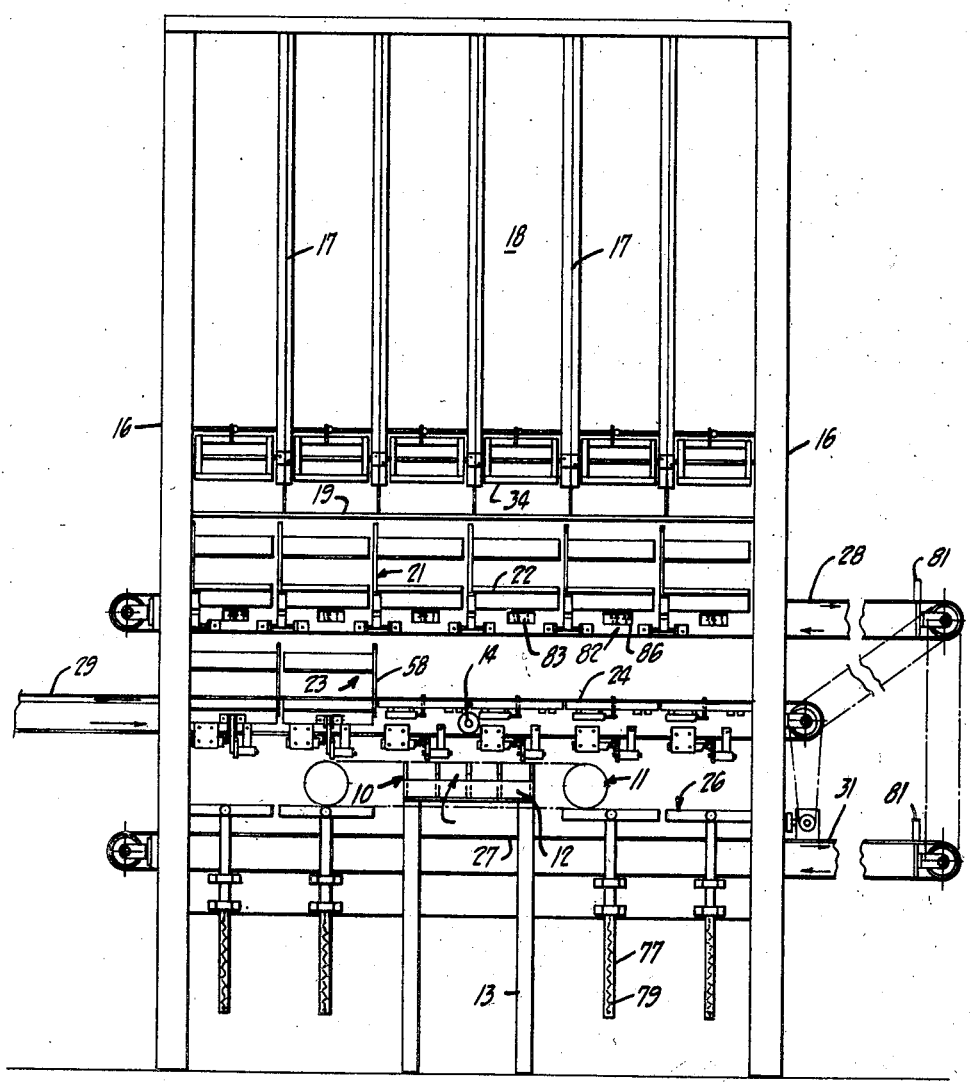
Figure 2 is a front elevational view of the machine illustrating the arrangement of the candling and packaging station.

As explained briefly above, the egg handling machine of this invention is designed to have eggs fed to a candling and packaging station where the operator performs the quality grading operation and places the eggs in appropriately labeled cartons of one or more sizes. Referring to Figures 1 and 2, the apparatus includes a candling and packaging station and apparatus 10 to which the eggs are fed from the grading apparatus 11 which may be of the type shown in our copending application Serial No. 599,910 filed June 16, 1945, for an "Egg Handling Machine."

As the eggs are delivered to the candling and packaging station 10 they are deposited in a bin 12 (Figures 1 and 2) supported by legs 13. A candling lamp 14 is provided above the bin 12.

Figure 3:
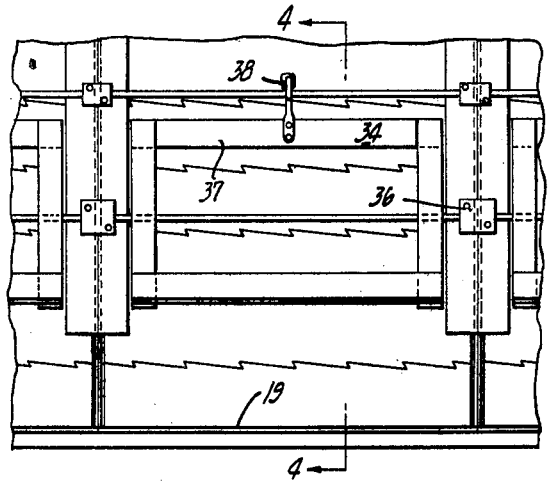
Figure 3 is a fragmentary enlarged elevational view of one of the carton feed mechanisms at the packaging station.
Figure 4:
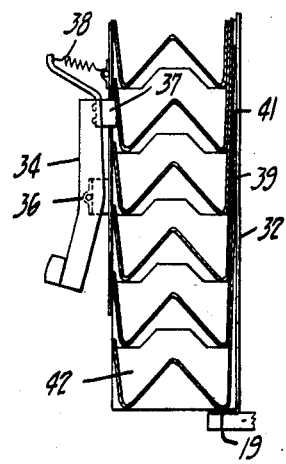
Figure 4 is a sectional view taken as indicated by the lines 4—4 in Figure 3.

The station 10 includes an upright frame 16 which is divided at the top by vertical partitions 17 into a plurality of egg carton holding chambers 18 which terminate in a horizontal shelf or ledge 19 above a plurality of packaging stations. As shown in Figure 2, there are three rows of packaging stations, one being the row 21 overlying shelf 22, the second being the row 23 overlying shelf 24, and the third or lowermost being the row 26 overlying the lowermost shelf 27. As seen in Figures 1 and 2 a plurality of conveyors 28, 29 and 31 are associated with the respective shelves 22, 24 and 27 so that filled cartons may be removed by these conveyors in a manner later to be described. The carton chambers 18, illustrated more clearly as to egg cartons adapted to accommodate twelve eggs in Figures 1, 3 and 4, are provided with a back wall 32 within which the cartons are placed, the lowermost carton engaging and being retained by a ledge 19 (Figure 4) with the lid portions of the cartons extending in overlapping fashion adjacent the wall 32. The hinged feed door 33 (Figure 1) is provided for receiving stacks of cartons adapted to accommodate either a dozen eggs or three dozen eggs and feeding them into the chamber or chute 18. A friction retaining device is provided for the cartons on the ledge 19, with exception of the lowermost carton, consisting of a rectangular frame 34 pivoted at 36 and having at its upper edge a pressure bar 37 which engages the fifth carton from the bottom under the influence of spring 38 so that all of the carton lids, except that of the lowermost carton which terminates at 39, are subject to pressure of the spring by virtue of the overlapping relation of the lids. The lid second from the bottom terminates at 41 as indicated in Figure 4. After pulling out or removing the lowermost carton 42 the operator can move the releasing frame 34 about 36 to allow the cartons to slide down and feed the next one into the lowermost position adjacent the ledge 19.

From the foregoing it is obvious that we have provided a plurality of carton holding chambers 18 which are adapted to retain a substantial quantity of egg cartons, either cartons adapted to accommodate thirty-six eggs or cartons adapted to accommodate twelve eggs. Our design is universal in that all of the carton holding chambers 18 and the associated frictional retaining devices are adapted to accommodate and operate in connection with cartons of either size. By utilizing the combination of carton holding chambers 18 and frictional retaining devices, the operator may withdraw the lowermost carton, regardless of its size, from the proper carton holding chamber 18 for future disposition of the same, without bringing down the entire stack of similar cartons. By simply applying slight pressure to the friction retaining device 34, the pressure bar 37 disengages itself from the remaining cartons allowing the same to drop downwardly until the lowermost carton engages the horizontal shelf or ledge 19 which prohibits further downward movement. At that time the cartons are again in position for subsequent removal of the lowermost carton.

As has previously been pointed out, certain of the carton holding members 18 are employed for holding a desired supply of egg cartons designed to accommodate thirty-six eggs. The carton holders in the row 21 are of the type for receiving these cartons as illustrated at 43 in Figures 5 and 6 and comprise an L-shaped frame 44 hinged at 46 on the front wall 47 of the shelf 22 and normally supported in inclined position above the belt 28. The frame 44 includes supporting strap 48 and a pair of spaced apart carton supporting arms including an angle arm 49 and a strip arm 51. After the carton 43 is full, if the frame 44 is turned clockwise as viewed in Figure 6 against the tension of spring 52, the bottom of the carton 43 will be engaged with the belt 28 so that the carton will be automatically removed from the holder frame 44.

It will be noted that when the frame 44 is pivoted about the point 46, the bottom side of members 49 and 51 engage the upper surface of the shelf 22 on either side of the belt 28. The belt 28, therefore, is free to engage the carton 43 which is supported by the member 44. It should also be pointed out that, as shown in Figure 2, the frame 44 is provided with only one vertical side member whereby the carton therewithin may be simply slid off the members 49 and 51 by reason of the action of the belt 28.

The next packing row or station 23 is adapted for use either with cartons adapted to contain thirty-six eggs or with cartons adapted to contain twelve eggs to perform, automatically, counting operations in a manner later to be described. The shelf 24 of this row (Figures 7 and 8) may be equipped with a depending frame angle 53 having a supporting bracket 54 extending downwardly therefrom. An L-shaped supporting bell crank 56 is pivoted at 57 on the bracket 54 to provide a support for a movable carton bracket 58 generally similar to the bracket or holder 44 and having a support arm 59 releasably engaged with pins 61 on the bell crank 56. The bell crank 56 is urged counterclockwise by the spring 62 to maintain the carton holder 58 and the carton 43 in the inclined position shown in Figure 8. In this position the contact operating pin 63 on the bell crank 56 is spaced from the contact assembly 64 secured on the angle bracket 53 and adapted to be operated by the bell crank 56 upon clockwise movement thereof to close a counting circuit through the leads 66 in a manner later to be described.

It will, of course, be kept in mind that, in addition to providing convenient members for holding the cartons in which the eggs are to be packed, the device is also adapted to perform automatically counting operations depending upon the number of eggs in the cartons counted. For use with cartons adapted to contain twelve eggs, the packing row or station 23 is provided with a shelf 24 which carries a pair of supporting ledges 67 adapted to receive an associated pair of supporting bars 68 of an auxiliary carton plate 69 adapted for abutting engagement with the edge of the shelf 24 with supporting bars 68 extending beneath the shelf 24 in engagement with the ledges 67. Also, a pair of similar insulated contact strips 71 are provided on the carton plate 69 to engage between corresponding pairs of insulated carton strips 72 on the shelf 24. Contact strips 71 are electrically connected to a switch 73 having a trip arm 74 projecting upwardy through the plate 69. Suitable leads extend from the pairs of strips 72 to a counter. A carton 42 adapted to contain a dozen eggs can be supported as shown in Figure 10 while the eggs are being inserted therein with the contact trip arm 74 disposed for operation by the carton 42 when it is slid rearwardly after filling on to the discharge conveyor 29.

In other words, if the carton to be packed is adapted to contain a dozen eggs it is set forwardly upon the members 69 in such a manner that it overlies the contact arm 74. When the carton has been packed and the operator wishes to dispose of the same he merely pushes it rearwardly, or to the right as viewed in Figure 10, at which time the carton engages the contact arm 74 actuating the counter in a manner to be presently described. Continued movement of the carton 42 will ultimately place the same in contact with and upon the moving belt 29. The moving belt 29 will transport the carton 42 to another station in much the same manner as has previously been explained in connection with the removal of cartons adapted to contain thirty-six eggs by the action of the belt 28.

A modified form of a holder adapted to be used in connection with a carton adapted to hold thirty-six eggs is shown in Figures 11 and 12 wherein the carton frame 76 is mounted on upright arm 77 slidably carried in bracket 78 on the shelf 27 and urged upwardly by spring 79. Upon filling of the carton the holder 76 can be depressed until the carton is engaged by the conveyor 31 and fed out of the holder 76. Respective carton stops 81 are provided with conveyors 28 and 31 to hold the cartons until they are removed therefrom.

As described above therefore, the package carry away portion includes a row 21 of packaging stations overlying shelf 22, a second row 23 of packaging stations over a shelf 24, and a third row 26 of packaging stations over a lowermost shelf 27. The moving belt conveyors 28, 29 and 31 which are associated with the respective shelves 22, 24 and 27, are driven by a suitable means, not shown, and are adapted to remove filled cartons from the conveyors as has previously been described.

For use in conjunction with the cartons adapted to contain thirty-six eggs we use the carton holder shown in Figures 8 and 12, which retain the carton in a handy elevated position in order to facilitate the placement of eggs therein by the operator. The container is adapted to be swung into a position immediately overlying the carry-away belt whereby the filled carton will be removed therefrom.

Figures 5, 6:
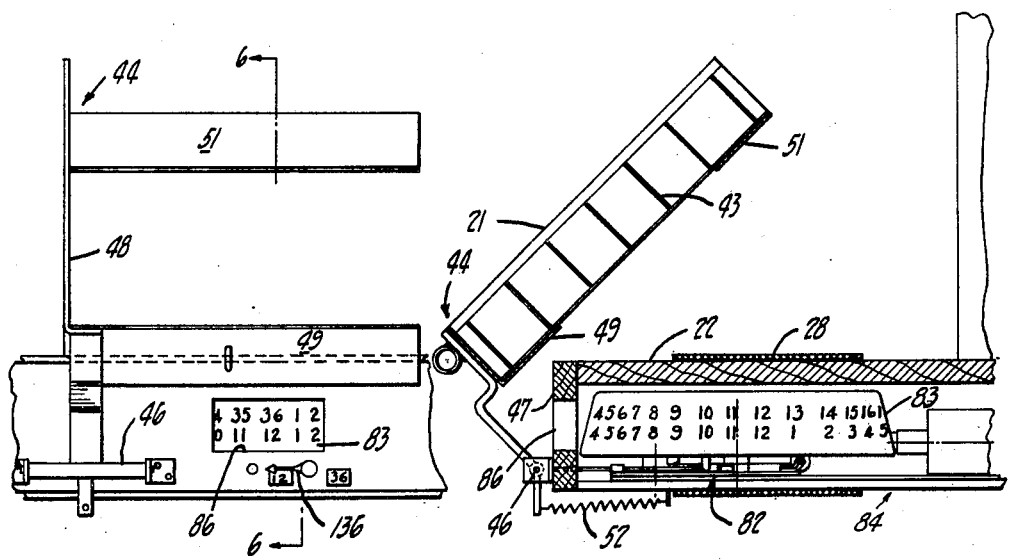
Figure 5 is an elevational view of a carton holding rack and an associated counter at the packaging station.
Figure 6 is a sectional view of the mechanism shown in Figure 5 as indicated by the lines 6—6 therein.

As referred to above, a counting mechanism is provided for counting the various eggs packed in the cartons and for this purpose a series of counting devices 82 are shown in Figures 2, 6 and 13, being mounted below the shelf 22 and including numeral drums 83 mounted on respective supporting brackets 84 and adapted for viewing through the windows 86. A common drive shaft 87 (Figure 13) is provided for the various counting devices.

As each counting device is similar, only one will be described in detail. Each counting device is adapted for manual operation to count eggs individually and for automatic operation to count the eggs in units of dozens or a selected number of dozens, in the present instance, in units of three dozen.

The counting unit includes a ratchet wheel assembly including a thirty-six tooth contact operating ratchet 88, a thirty-six tooth ratchet 89 for manual counting, a three tooth ratchet 91 for counting in units of twelve and a one tooth ratchet 92 for counting in units of three dozen. The ratchets are secured together in spaced relation and journaled about a stationary shaft 93 and urged by a friction drive to turn clockwise as viewed in Figure 15. The friction drive mechanism includes a friction disk 94 which engages the lower face of the ratchet 89, the parts being urged together by a three pronged spring member 96 secured on shaft 93 and engaging the upper face of the ratchet 89. The friction disk 94 is connected by collar 97 to a worm wheel 98 having a drive worm 99 associated therewith.

Of the above ratchet wheels, the ratchet 88 is an impulse or transmitting ratchet wheel having a spring urged pawl 101 cooperating therewith and also carrying a contact closing arm 102 associated with the spring contact members 103 and having leads 104 extending to a suitable counter.

The ratchets 89, 91 and 92 are escapement ratchets and are adapted for operation to cause escapement of the ratchet assembly for a given number of steps in accordance with a given number of eggs counted. The thirty-six tooth ratchet 89 is adapted for manual operation by means including an escapement pawl 106, Figure 15, pivoted at 107 and urged in a counterclockwise direction by spring 108. The tail 109 of the pawl 106 is engaged by the nose 111 of a lever 112 pivoted at 113 to a pivotal link 114 to provide a translational movement of the lever 112. A spring 116 is connected to the lever 112 to urge it to the left as viewed in Figure 15 and into engagement with the tail 109 of the released pawl 106. A manual operating plunger 117 is slideably mounted in a square tube 118 and is held inactive by a compression spring 119 which maintains the enlarged end 121 of the plunger 117 against the tube 118. Each depression of the manual operating plunger or key 117 will operate the lever 112 to cause the pawl 106 to release the ratchet wheel 89 and consequently the ratchet wheel 88, for one step of movement so that one impulse is supplied to the counter. The nose 111 of the lever 112 travels off the tail 109 of the pawl 106 and is restored to the position shown in Figure 15 upon release of the plunger 117 thus providing single stroke operation of the plunger 117.

Figure 17:
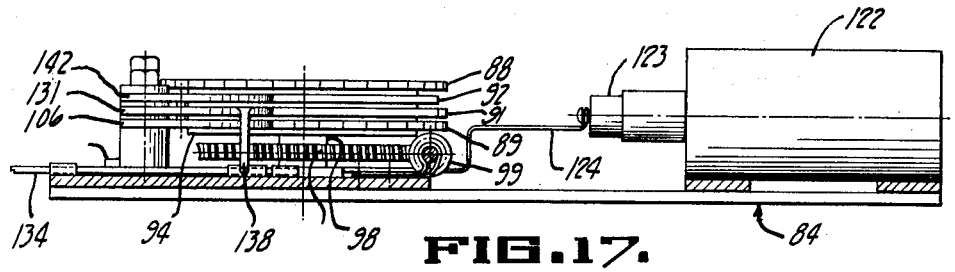
Figure 17 is an elevational view partly in section of the counting device shown in Figure 14 as indicated by the line 17—17 therein.
Figures 18, 19:
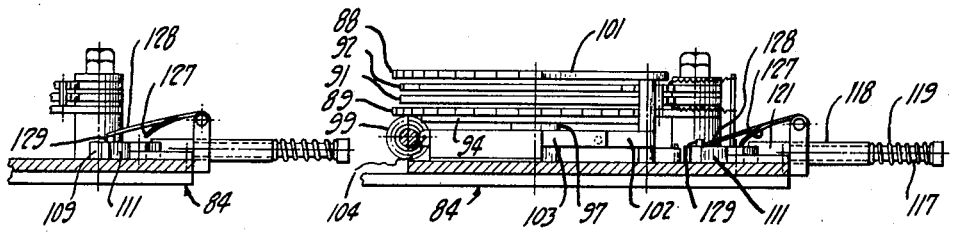
Figure 18 is another view of the counting mechanism shown as indicated by the line 18—18 in Figure 14 with the parts positioned for automatic counting.
Figure 19 is an elevational view, partly in section, of the counting device as indicated by the line 19—19 in Figure 14 with the parts positioned for manual counting of individual eggs.
Figure 20:
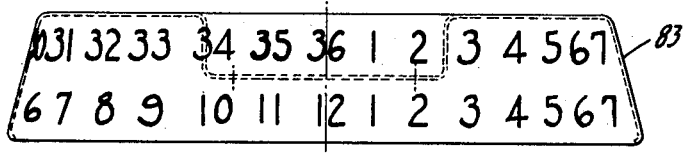
Figure 20 is a detailed view of the counting drum.

For automatic operation of the ratchet wheels a solenoid 122, Figures 14 and 17, is provided which is operated by one of the sets of contact members 64 and 73, previously referred to, so that its armature 123 will be drawn within the solenoid and will operate the lever 112 through a link 124. Operation of the lever 112 by the solenoid 122 serves to disable the released pawl 106 for the single counting ratchet 89. For this purpose a two-armed gravity latch 126 is provided with one arm 127 operable by a plunger 121 and a second arm 128 positioned for cooperation with a pin 129 on the tail 109 of the pawl 106. The arm 128 drops into latching engagement with the pin 129 upon operation of the lever 112 by the solenoid 122 and remains in this position until the plunger 117 is operated to perform a single count. When the plunger 117 is again operated to perform a single count, plunger 121 engages the arm 127 of the latch 126 to move the arm 128 of the latch from engagement with the pin 129 so that the pawl 119 can again engage the ratchet key 89.

To provide for operation in counting the eggs in dozen lots with the three-tooth ratchet 91 a second pawl 131, Figure 15, is pivoted to the shaft 107 and adapted for abutting relation with a pin 144 on the pawl 106, the pawl 106 also serving as the operating means to release the pawl 131 from engagement with the associated tooth 132 of the ratchet 91. The pawl 131 as shown in Figure 15 is in operative relation with the ratchet 91, this condition being provided for by the positioning of a manually settable control including the eccentric 133 on a rod 134 having a pointer shaped handle 136 and journaled in spaced bearings 137. The eccentric 133 cooperates with a laterally extending and depending finger 138 of the pawl 131 to allow the pawl in the position shown in Figure 15 to engage the ratchet 91 under the influence of its spring 139. If the handle 136 is turned from the position shown in Figure 5, clockwise to alignment with the indicia 36, the eccentric 133, Figure 15, is turned from the position shown to that shown in Figure 16 where the pawl 131 has been moved to its inactive position.

To enable counting in units of thirty-six eggs, the ratchet 92 is provided with a single tooth 141 cooperating with the pawl 142, also pivoted on the shaft 107 and having an associated spring 143 which serves to engage the pawl 142 with the ratchet 92. The pin 144 on the pawl 106 also underlies the pawl 142 to operate this pawl upon energization of the solenoid 122.

From the above description it will be apparent that the ratchet assembly can be conditioned for automatic counting under control of the solenoid 122 in either units of one dozen or three dozen by appropriate setting of the control handle 136 so that when the lever 112 is operated by the solenoid 122 its nose 111 will engage the tail 109 of the pawl 106 and, through the pawl 106 and its pin 144, release either the pawl 131 from its ratchet 91, or the pawl 142 from its ratchet 92. It will be noted that whenever the solenoid 122 is operated to initiate an automatic count, the pawl 106 becomes latched in inactive position after the initial operation by the lever 112 until it is again released by virtue of another manual count by operation of the manual counting plunger 117.

From the foregoing it will be obvious that we have invented a device by which eggs may be counted in either numbers of one or three dozens, the counting being accomplished either manually or automatically, depending upon the wish of the operator. If the counting is to be done automatically, the movement of a carton of eggs from the packaging position to the carryaway position overlying the conveyor belt will, either through the contact 74 or the contact 64 actuate the solenoid 122. Manual operation is accomplished by actuation of the plunger 117.

The operation of the egg handling machine of our invention may be briefly summarized as follows:

As previously explained, the eggs are discharged into the bin 12 at the candling and packaging station as shown in Figures 1 and 2. The various sizes of eggs are separately graded according to quality and are placed in egg holding cartons such as shown at 42 in Figure 4 or at 43 in Figure 6. If the eggs are being packed in the cartons adapted to accommodate a dozen eggs, the cartons 42 may be employed as shown in Figure 10. When the carton is filled it is slid to the right, as viewed in Figure 10, past the count tripping arm 74 for the "dozen" counting ratchet of the counting mechanism and on to the conveyor 29 for disposal in the usual manner to another portion of the plant for further operations.

If the eggs are being packed in cartons adapted to contain thirty-six eggs, the cartons may be positioned as shown, for example, in Figures 8 or 12. If automatic counting is desired, the holder as illustrated in Figure 8 may be employed, so that the carton is transferred to the conveyor 29 by the downward tipping of the carton holder 23, whereupon the "three dozen" count ratchet of the counting mechanism is released.

It will be understood that the above quality grading operations may be performed with respect to each of the sizes of eggs and that they will be packed in appropriate cartons as pointed out above.

As the counting operation is performed, each particular quality in size of egg is counted on the particular counting drum 83 of the series shown in Figure 2, with the operation being controlled for "dozen" or "three dozen" counts as indicated by the setting of the pointer 136 in Fig. 5. It will be understood that where odd numbers of eggs are to be counted, the manually operable control key or button 117 is utilized for the counting operation.

We claim:

1. In an egg handling machine, an egg carton holder having a flat bottom and one open side, a cutaway portion in said bottom, a work table, a belt overlying said work table, spring means normally holding said holder in spaced position above said belt with the cutaway portion of said bottom in alignment with said belt, said holder being disposed with respect to said belt so that a carton is in said carton holder will engage said belt when the holder is allowed to engage said table, and independent means for driving said belt.

2. In an egg handling machine, an egg carton holder having a flat bottom and at least one open side, a cutaway portion in said bottom, a work-table, means resiliently positioning said holder out of engagement with said work table, a continually driven flat belt passing over said table, said holder being disposed with respect to said conveyor whereby when the carton holder engages said table said belt is disposed within the cutaway portion of the bottom of said holder and above the upper plane of said flat bottom so that a carton therein will be moved out of the open side of said holder, and driving means associated with said belt independent of the operation of said holder.

3. In an egg handling machine, an egg carton holder having a cutaway bottom and an open side, a conveyor adjacent said holder, and means providing a pivotal mounting for said holder in inclined position and resiliently positioning said holder normally out of engagement with said conveyor, said holder being disposed with respect to said conveyor for movement to engage a carton within the conveyor so that the carton will be moved out of the open side of said holder, and means for continually driving said conveyor independent of the operation or position of said egg carton holder.

ROBERT C. SNEED.
CURTIS S. JORDAN.

References Cited in the file of this patent

UNITED STATES PATENTS

| Number | Name | Date |
|---|---|---|
| 870,521 | Peck | Nov. 5, 1907 |
| 905,043 | Anderson | Nov. 24, 1908 |
| 1,003,295 | Rodman | Sept. 12, 1911 |
| 1,447,629 | Ramsey | Mar. 6, 1923 |
| 1,613,552 | Armstrong | Jan. 4, 1927 |

FOREIGN PATENTS

| Number | Country | Date |
|---|---|---|
| 749,937 | France | Aug. 1, 1933 |